United States Patent
Otto (10) Patent No.: US 6,269,320 B1
(45) Date of Patent: Jul. 31, 2001

(54) SUPERCOOLED LARGE DROPLET ICE DETECTOR

(75) Inventor: John Timothy Otto, Shakopee, MN (US)

(73) Assignee: Rosemount Aerospace, Inc., Burnsville, MN (US)

(*) Notice: Subject to any disclaimer, the term of this patent is extended or adjusted under 35 U.S.C. 154(b) by 0 days.

(21) Appl. No.: 09/196,407

(22) Filed: Nov. 19, 1998

(51) Int. Cl.[7] .............................. G01D 3/00; B64D 15/00
(52) U.S. Cl. .................... 702/127; 702/132; 340/580; 340/581; 244/134 C
(58) Field of Search ...................... 702/127, 132, 702/104; 244/134 R, 134 B, 134 C; 340/580–583, 962; 73/170.26, 579

(56) References Cited

U.S. PATENT DOCUMENTS

| | | | |
|---|---|---|---|
| 3,341,835 | | 9/1967 | Werner et al. ................. 340/234 |
| 3,940,622 | * | 2/1976 | Stallabrass et al. .............. 250/338.1 |
| 4,210,021 | * | 7/1980 | Vykhodtsev et al. .............. 340/580 |
| 4,441,363 | * | 4/1984 | Hill et al. ..................... 73/170.26 |
| 4,553,137 | | 11/1985 | Marxer et al. ................. 340/582 |
| 4,611,492 | | 9/1986 | Koosmann ....................... 73/579 |
| 5,313,202 | * | 5/1994 | Hansman, Jr. et al. ........... 244/134 R |
| 5,562,265 | | 10/1996 | Rauckhorst, III ............... 244/134 |
| 5,657,951 | | 8/1997 | Giamati ....................... 244/134 |
| 5,743,494 | | 4/1998 | Giamati et al. ................ 244/134 |
| 5,760,711 | * | 6/1998 | Burns ........................ 340/962 |

OTHER PUBLICATIONS

AIAA–98–0577, NASA/FAA/NCAR Supercooled Large Droplet Iceing Flight Research: Summary of Winter 96–97 Flight Operations, D. Miller & T. Ratvasky, NASA Lewis Research Center; B. Bernstein & F. McDonough, National Center for Atmospheric Research; J.W. Strapp, Atmospheric Environment Services; 36th Aerospace Sciences Meeting & Exhibit, Jan. 12–15, 1998/Reno, NV, 26 pgs.

AIAA 98–0487, Droplet Size Distribution and Ice Shapes; Anil D. Shah, Michael W. Patnoe, and Ervin L. Berg, The Boeing Company; 36th Aerospace Sciences Meeting & Exhibit, Jan. 12–15, 1998/Reno, NV, pp. 1–20.

No. 881386, An Overview of the Current NASA Program on Aircraft Icing Research; Richard J. Ranaudo, Andrew L. Reehorst and Mark G. Potapczuk, NASA Lewis Research Center, Cleveland, OH; Copyright 1988 Society of Automotive Engineers, Inc., pp. 1–18.

\* cited by examiner

Primary Examiner—Kamini Shah
Assistant Examiner—Bryan Bui
(74) Attorney, Agent, or Firm—James M. Rashid (57) ABSTRACT

The present invention pertains to an ice detector particularly adapted to detect the presence of water droplets capable of forming supercooled large droplet ("SLD") icing on aircraft surfaces. The invention takes advantage of boundary layer flow patterns adjacent to the detector, and their effect on water droplets, to provide a signal indicative of SLD icing conditions when they exist. The detector is also capable of distinguishing between the presence of water droplets that cause traditional cloud icing and SLD icing.

27 Claims, 5 Drawing Sheets

SUPERCOOLED LARGE DROPLET ICE DETECTOR

BACKGROUND OF THE INVENTION

1. Technical Field

This invention relates to ice detectors, and more particularly, to ice detectors for detecting the presence of supercooled large droplets that freeze and form ice on aircraft surfaces.

2. Background Art

Ice detectors are commonly used on a variety of aircraft to advise the pilot that he or she is flying in conditions that may result in the formation of ice on the aircraft. See, for example, U.S. Pat. Nos. 4,611,492; 4,553,137; and 3,341,835. If ice forms on wing surfaces or other control surfaces such as flaps or ailerons, it can degrade the aerodynamic performance of the aircraft, and in some cases, may make the aircraft difficult to control. In extreme instances of ice formation on the aircraft, the pilot may be unable to control the flight direction, and the aircraft can crash. Most ice detectors include electronics that provide a signal to the pilot of icing conditions, which allow the pilot to either activate the aircraft's ice protection systems or to change the aircraft's course and fly out of the icing conditions. Conventional ice protection systems are generally based on thermal, chemical or mechanical principals (or a combination thereof) and include electric heaters, pneumatic boots, or bypass air heaters; see, for example, U.S. Pat. Nos. 5,743,494; 5,657,951; and 5,562,265. Advanced ice detectors, commonly referred to as primary ice detectors, automatically activate the aircraft's anti-icing equipment when icing conditions are detected, without further action required by the pilot.

In general, ice will form on an aircraft surface if the aircraft is flying through water droplets whose temperature is below the freezing point of water, namely 0° C. (32° F.). Droplets below the freezing point are often referred to as "supercooled" droplets.

A typical precipitation-carrying cloud is comprised of water droplets having an average diameter of about twenty microns (0.00008 inches). An airplane flying through a cloud containing twenty micron diameter droplets, even if the droplets are supercooled, usually does not experience dangerously high levels of icing, because of the aerodynamic effect the aircraft surface has on the direction of the droplets as they flow over the surface of the aircraft. For example, the wing disturbs the flow of air over the wing surface such that the majority of water droplets in the twenty micron diameter range do not actually strike the surface, but rather flow past it. This is because, in general, the droplets have insufficient momentum to continue moving in a flow direction that would otherwise cause them to strike the wing surface; because of their small momentum (primarily a result of their small size) the disturbance of air flow in which they are entrained causes the droplets to follow the direction of the airflow and miss the wing. It has been observed, however, that some small droplets do in fact strike and freeze on the wing surface to form ice. This usually happens at the leading edge of the wing, and as indicated above, most aircraft are built with anti-icing or other ice protection devices to remove ice that forms at the leading edge of the wing. Ice has also been observed to form on other control surfaces of the aircraft and these, too, are often outfitted with means for removing ice that will form.

Several recent incidents involving actual crashes of commercial aircraft have shown that ice sometimes forms on wing surfaces aft, or downstream of, the ice protection systems on the wing and other control surfaces. Research has shown that such icing is caused by supercooled water droplets larger than the typical twenty micron diameter sized cloud droplets. See, for example, "NASA/FAA/NCAR Supercooled Large Droplet Icing Flight Research: Summary of Winter 96–97 Flight Operations" by Miller et al., ALAA 98-0577; and "Droplet Size Distribution and Ice Shapes" by Shah et al., AIAA 98-0487. It is believed that these large droplets are generally in the range of about fifty microns or more in diameter. Research has shown that icing caused by these so-called supercooled large droplets (sometimes referred to as "SLD icing") occurs because the SLD droplets have considerably more momentum (due to their large diameter and associated larger mass) than the typical twenty micron diameter cloud droplets; these SLD droplets travel in a flow path that is generally not disturbed or changed by the aircraft wing. As a result, these large droplets strike the leading edge of the wing as well as portions of the wing downstream of its leading edge. SLD ice that forms on the wing leading edge surface is generally not a problem because it is removed by the conventional ice protection systems referred to above; however there is usually no way to remove ice that forms on the aft sections of the wing and other control surfaces when the aircraft is airborne. This icing not only disrupts the airflow over the wing and other control surfaces, but also adds extra weight to the aircraft, thereby compromising the pilot's ability to properly and safely navigate the aircraft.

Conventional, prior art ice detectors are not able to advise the pilot whether ice forming on the detector is caused by the small (twenty micron) water droplets or whether it is caused by large supercooled (fifty micron or larger) droplets. Often, the air through which the pilot is flying contains a varied population of water droplets such as a first population of droplets in the twenty micron size range (typical cloud droplets) and a second population of droplets in the fifty micron size range (SLD droplets). Further, while prior art ice detectors will advise the pilot that ice has formed on the detector, there is no way for the pilot to know whether ice is forming solely on the surfaces protected by the conventional ice protection systems or whether it is also forming on surfaces not serviced by these ice protection systems (except for visual inspections performed by the pilot, which are not always possible during flight.)

Because airline safety, in general, and passenger safety, in particular, are two of the foremost concerns of the airline industry, what is needed is an ice detector that can advise the pilot whether the aircraft is flying in an environment populated by water droplets typically found in clouds (namely, droplets having a mean diameter of about twenty microns) or whether the aircraft is flying in an environment populated by supercooled large droplets.

SUMMARY OF THE INVENTION

In accordance with the present invention, an ice detector for use in an environment containing supercooled water droplets, and for distinguishing between the presence of a first population of water droplets indicative of a first icing condition and a second population of water droplets indicative of a second icing condition different from the first condition, comprises a sensor for providing a signal indicating the formation of ice thereon, and a housing for supporting the sensor and including means for modifying the flow direction of the droplets flowing past the housing such that the first population of droplets are more likely to strike and form ice on the sensor than the second population of droplets.

In a preferred embodiment of the invention, the detector includes means for deflecting the second population of droplets such that they are not likely to strike and form ice on the sensor, and the first population of droplets are not so deflected and are likely to strike and form ice on the sensor. In this embodiment, the means for deflecting the second droplets includes means for modifying a boundary layer of fluid adjacent to the sensor. The boundary layer is modified by a fluid passageway in the housing that has an inlet end in a leading edge of the housing and an outlet end upstream of the sensor. By modifying the boundary layer, the droplet flow path directions are also modified such that the first droplets strike the sensor and the second droplets do not.

More particularly, the ice detector of the present invention comprises a sensor and a housing for supporting the sensor, wherein the housing includes a base, a tip having a tip surface, and a leading edge and trailing edge extending from the base to the tip, wherein the sensor extends above the tip surface between the leading and trailing edges, and the housing includes a fluid passageway extending from an inlet end in the leading edge to an outlet end on the tip surface, and wherein the passageway outlet end is downstream of the leading edge and upstream of the sensor, and the housing further includes a pair of spaced apart rails extending above the surface of the tip, and the sensor and outlet end are between the rails.

Other features and advantages of the present invention will be evident by reference to the figures and description of the best mode for carrying out the invention, as discussed below.

DETAILED DESCRIPTION OF THE PREFERRED EMBODIMENT

Figure 1:
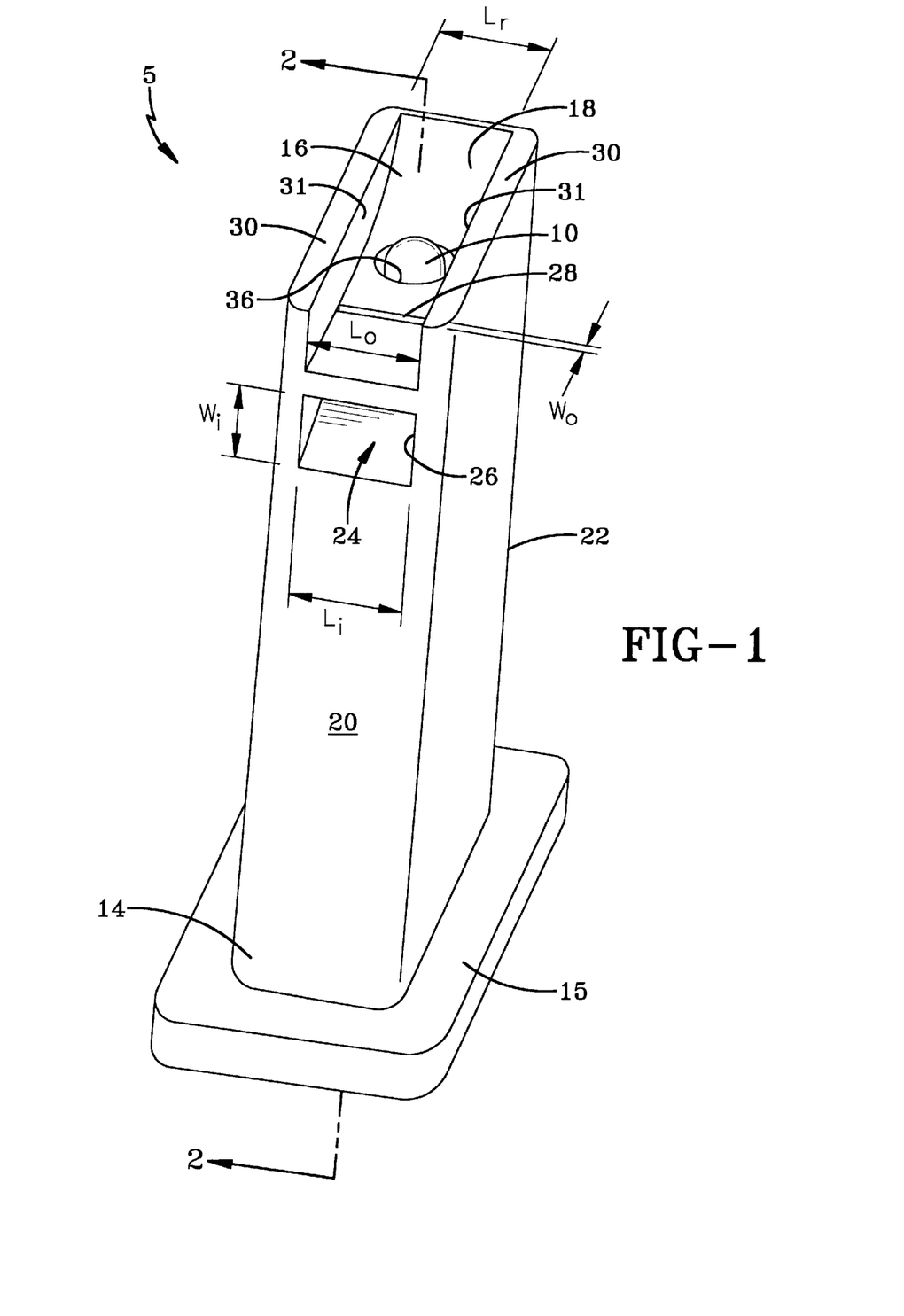
FIG. 1 is a perspective view of an ice detector in accordance with the present invention.
Figure 2:
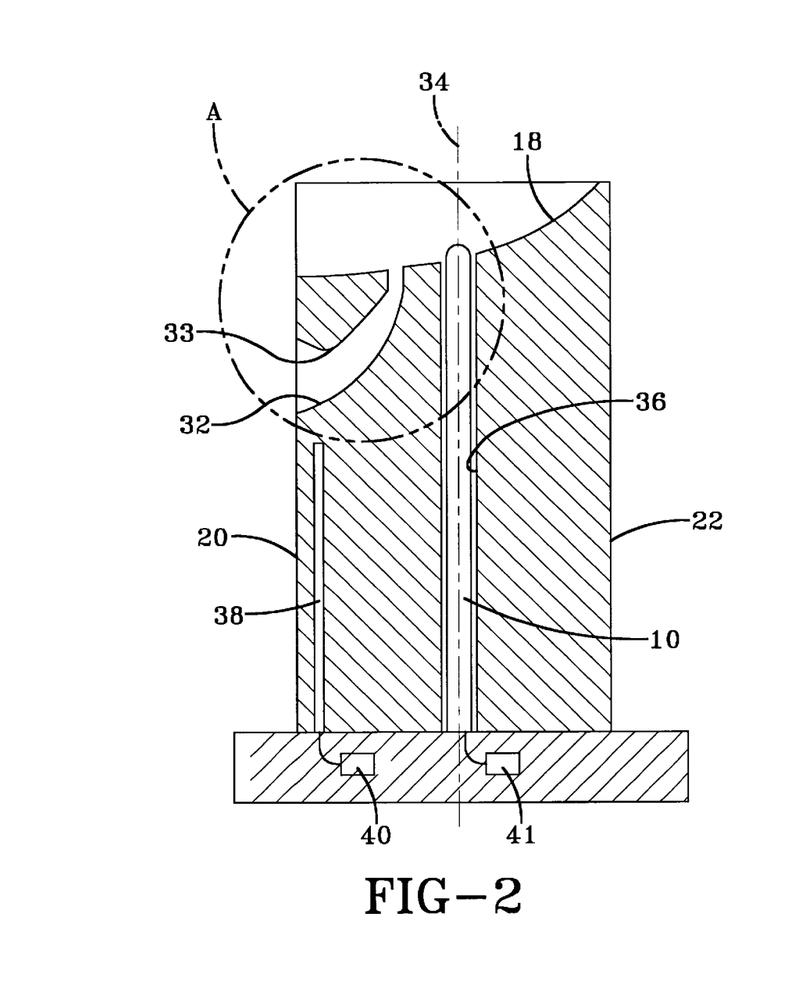
FIG. 2 is a cross-sectional view of an ice detector of the present invention taken along the lines 2—2 of FIG. 1.

The ice detector of the present invention may be understood by reference to FIGS. 1 and 2. In these figures, the ice detector is shown generally by the reference numeral 5 and comprises a sensing element (or sensor) 10 disposed within and supported by a housing 12 that extends from a housing base 14 to the housing tip 16. The housing 12 is attached to a support structure 15 that includes means such as bolts or screws (not shown) for securing the detector 5 to the surface of the structure that is to be monitored for the formation of ice. When attached to the fuselage surface of a modern jet or propeller-powered aircraft, the detector 5 is mounted, in general, perpendicular to the surface, outside of the boundary layer adjacent to such surface. The housing tip 16 includes a tip surface 18 through which the sensor 10 extends. The housing 12 has a leading edge 20 and a trailing edge 22, and as shown in the figures, the sensor 10 is located between the edges 20, 22. The tip surface 18 inclines upwardly (i.e., away from the base 14) from the leading edge 20 of the housing 12 to the trailing edge 22 of the housing 12. A fluid passageway 24 extends from a passageway inlet 26 in the housing leading edge 20 to a passageway outlet 28 in the tip surface 18. The inlet 26 is adjacent the tip surface 18; and the outlet 28 is downstream of the leading edge 20 and upstream of, and slightly spaced away from, the sensor 10. The housing 12 includes a pair of axially spaced-apart rails 30 that extend above the housing tip surface 18. The rails 30 extend above the surface 18 a distance greater than the distance the sensor 10 extends above the surface 18. The rails 30 run from the housing leading edge 20 towards the trailing edge 22. As will be described in more detail below, the rails 30 shield or shadow the sensing element 10 from certain sized water droplets during flight through a water droplet-containing environment. Preferably, the housing 12 is fabricated from a material with high heat conductivity characteristics, such as aluminum.

The passageway inlet and outlet ends 26, 28, respectively, each have a cross sectional area defined by a length and width. The length of the inlet, $L_i$, is about the same as the length of the outlet $L_o$; the inlet and outlet lengths $L_i$ and $L_o$ are both slightly less than the length (or distance) $L_r$ between facing surfaces 31 of the rails 30. The inlet and outlet ends 26, 28, respectively, are also defined by a width (or height). As seen in FIG. 1, the width $W_i$ of the inlet 26 is greater than the width $W_o$ of the outlet 28. Accordingly, the cross-sectional area of the inlet 26 at the leading edge 20 of the housing 12 is greater than the cross-sectional area of the outlet 28 at the tip surface 18 of the housing 12. As is seen in more detail in FIG. 2, the cross-sectional area of the fluid passageway 24 decreases from the inlet end 26 to the outlet end 28 in order to maximize the velocity of the air in the passageway 24 at the outlet end 28. Further, the axially extending passageway walls 32 and 33 are configured such that both walls are approximately parallel to the tip surface 18 at the passageway inlet end 26, and approximately parallel to the axis 34 of the sensor element 10 at the passageway outlet end 28.

As shown in FIG. 2, the axis 34 of the sensor 10 is approximately parallel to the leading and trailing edges 20 and 22, of the housing 12. The sensor 10 is thermally isolated from the housing 12 and extends in a channel 36 through the housing 12; the sensor 10 is secured to the attachment structure 15 by means not shown. Adjacent the leading edge 20 of the housing 12 are means for removing ice that forms on the housing leading edge 20 and surfaces adjacent to the leading edge. These ice removal means may include an electrically powered heater, or a channel through which warm air is flowed, or a pneumatically or electrically activated structure that removes ice that forms on the leading edge. In FIG. 2, a conventional cartridge heater 38 is shown running along the leading edge of the housing 12, adjacent the surface of the leading edge 20 but spaced away from the sensor 10, for keeping the temperature of the leading edge above freezing. The heater 28 is controlled by electronics schematically indicated by reference numeral 40. Associated with the heater 28 is a thermocouple (not shown) or similar temperature sensing device that monitors the temperature of the housing, particularly the temperature along the housing leading edge 20. If the temperature of the housing 12 drops below freezing, the heater controller energizes the heater until the temperature of the housing 12 rises above freezing. Because the sensing element 10 is thermally isolated from the housing 12, the heat inputted to the housing has a minimal effect on the operation of the sensing element 10. In the event the temperature of the sensing element 10 must be controlled, a conventional Peltier junction may be utilized, wherein the cold junction is in thermal communication with the element 10 and the hot junction is in thermal communication with the housing 12.

Figure 3:
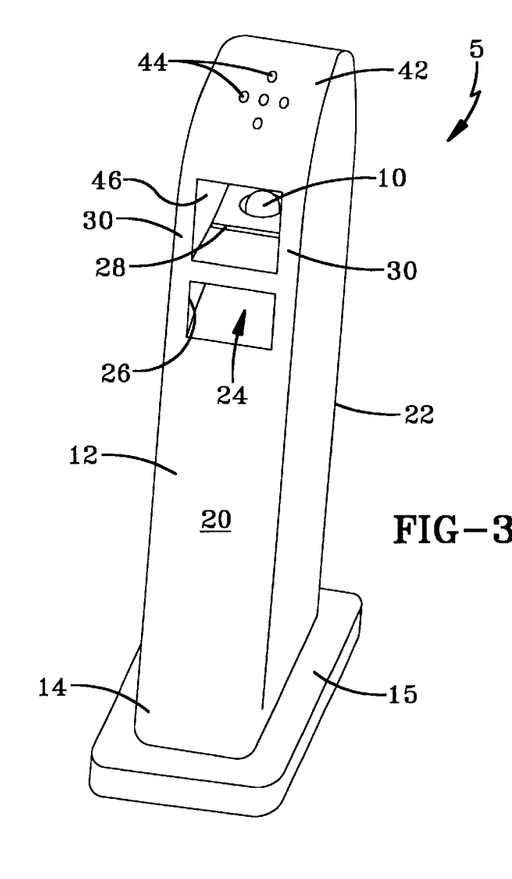
FIG. 3 is a perspective view of an alternative embodiment of the present invention.

An alternative embodiment of the invention is shown in FIG. 3 (wherein the reference numerals of FIG. 1 are used in FIG. 3 to denote similar features). The housing 12 includes an integral cap 42 that extends above the sensor 10 and passageway outlet end 28. As is seen in FIG. 3, the cap is integral with and extends between the rails 30 from the housing leading edge 20 to the housing trailing edge 22. Not shown in FIG. 3 is a cartridge heater that extends adjacent to the leading edge 20 and sensor 10, similar to the configuration shown in FIG. 2. Optionally, the housing includes one or more fluid passageways 44 that extend through the cap in an area above the sensor 10.

In FIG. 3, the cap 42 and its integrally attached rails 30 define a second inlet end 46 at the housing leading edge 20 and a second outlet end (not shown) at the housing trailing edge 22. The cap 42 is constructed and arranged such that the cross sectional area of the second inlet end 46 is slightly larger than the cross sectional area of the second outlet end; and so that the cross sectional area of the second inlet end 46 is slightly larger than the area of the first inlet end 26. The ice detector 5 shown in FIG. 3 also includes an ice protection removal system similar to that discussed above with reference to FIGS. 1 and 2.

Figure 4:
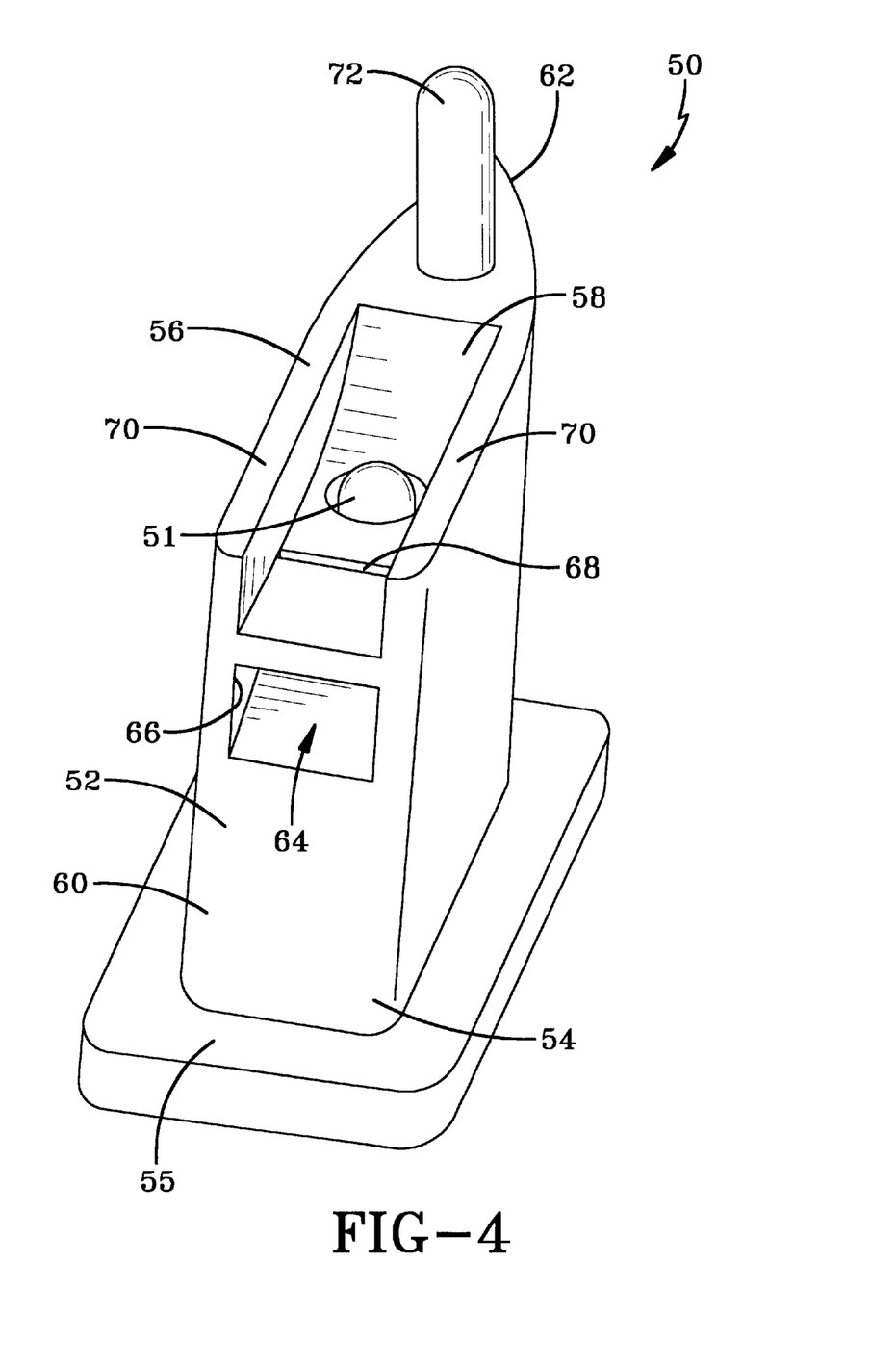
FIG. 4 is an additional embodiment of the present invention.

A further embodiment of the present invention is shown in FIG. 4. The detector 50 shown in FIG. 4 includes a first ice detection sensor (or sensing element) 51 surrounded and supported by a housing 52 that includes a base 54 and an attachment structure 55. The housing 52 extends from the base 54 to the tip 56, and the sensor 51 extends slightly above the surface 58 of the tip 56. The sensor 51 extends through a channel (not shown) in the housing 52, similar to the manner shown in FIGS. 1 and 2. The sensor 51 is thermally isolated from the housing 52, which is preferably made from a high thermal conductivity material such as aluminum or any of the other well-known materials having high thermal conductivity. The detector 50 has a leading edge 60 and a trailing edge 62. A fluid passageway 64 extends from an inlet 66 in the leading edge 60 to an outlet 68 in the tip surface 58. A pair of spaced-apart rails 70 extend above the tip surface 58, on each side of the sensing element 51, to a location downstream of the sensor 51. As seen in FIG. 4, the tip surface 58 inclines upwardly in the direction from the leading edge 60 toward the trailing edge 70.

Downstream of the first sensor 51 and upstream of the trailing edge 62, the detector 50 also includes a second ice detection sensor 72. The second sensor 72 is axially aligned with the first sensor 51, and extends above the tip surface 58 a distance greater than the distance above which the first sensor 51 extends. Preferably, the second sensor 72 extends above the surface 58 of the tip 56 an amount that is in the range of about five to ten times greater than the distance the first sensor 51 extends above the surface 58. As is seen in FIG. 4, not only does the second sensor 72 extend above the tip surface 58 a distance greater than the first sensor 51, the second sensor 72 is also downstream of the rails 70 and does not tend to be shielded or shadowed by the rails 70. As will be described in more detail below, the rails 70 shield the first sensing element 51 from impact by certain sized water droplets. Furthermore, the second sensor 72 extends through a channel (not shown) in the housing 52 and is thermally isolated from the housing 52. The ice detector 50 additionally includes means for removing ice from the housing leading edge (as described with respect to FIGS. 1–3 above), and in particular the aforementioned cartridge heater and its associated controller. Pettier junction technology is optionally used for one or both of the detector elements 51 and 72, as needed.

Figure 5:
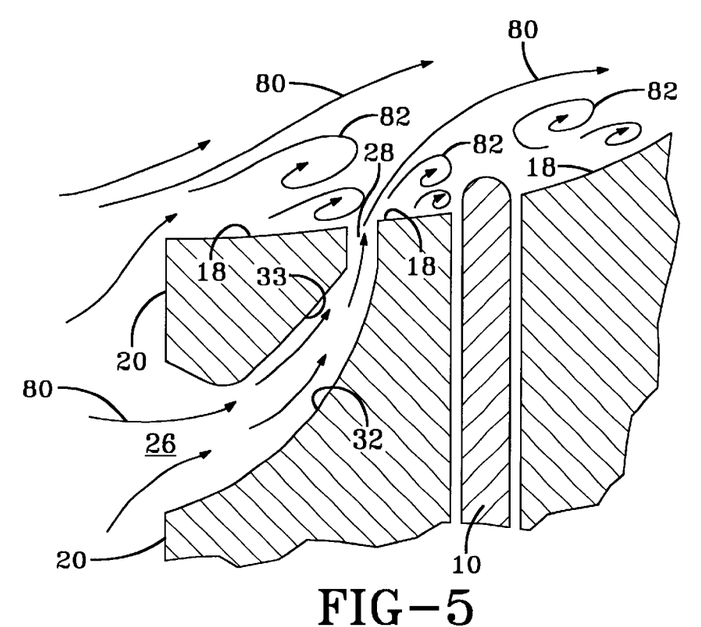
FIG. 5 is a schematic view generally of the area marked as A in FIG. 2, depicting the flow direction of air past the detector of FIG. 2.

For each of the embodiments described above, the particular aerodynamic shape of the detector housing and the effect it has on the flow conditions of air and water droplets as the air/droplet mixture flows past the detection results in the desirable performance characteristics of the detector of the present invention. Computational fluid dynamic analysis shows that the flow of air past the detector is significantly influenced by the housing features. Referring to FIG. 5, which is a schematic view of air (and no water droplets) flowing along the tip surface 18 of the detector 5, the flow of air is indicated by arrows represented generally by the reference numeral 80. The passageway inlet 26 and sensing element 10, as well as the upwardly inclining shape of the tip surface 18, all affect the flow of air 80 as it flows along the tip surface 18. As is seen in FIG. 5, air flowing through the passageway 24 forms a series of vortices 82 (sometimes referred as vacuum or separation bubbles) both upstream and downstream of the passageway outlet 28. Vortices 82 also form upstream and downstream of the sensing element 10. These vortices 82 force the air flowing past the sensing element 10 to flow away from and over the sensing element 10, as shown in the figure. The presence of the rails 30 on either side of the sensing element 10 causes the air to flow in the generally axial direction; that is, the air flows between the rails 30 from the housing leading edge 20 to the housing trailing edge 22. The passageway 24 and the sensing element 10 have the greatest effect on the boundary layer of air flowing along the tip surface 18. The boundary layer is generally considered to be in the range of about 0.25–1.25 cm (about 0.1–0.5 in.) thick as it passes over tip surface 18. The ability to control the shape and flow path direction of the boundary layer is a key factor of the invention, because these boundary layer characteristics have a significant effect upon water droplets that flow past the sensing element 10, as described in more detail below, and with particular reference to FIGS. 6 and 7.

Figure 6:
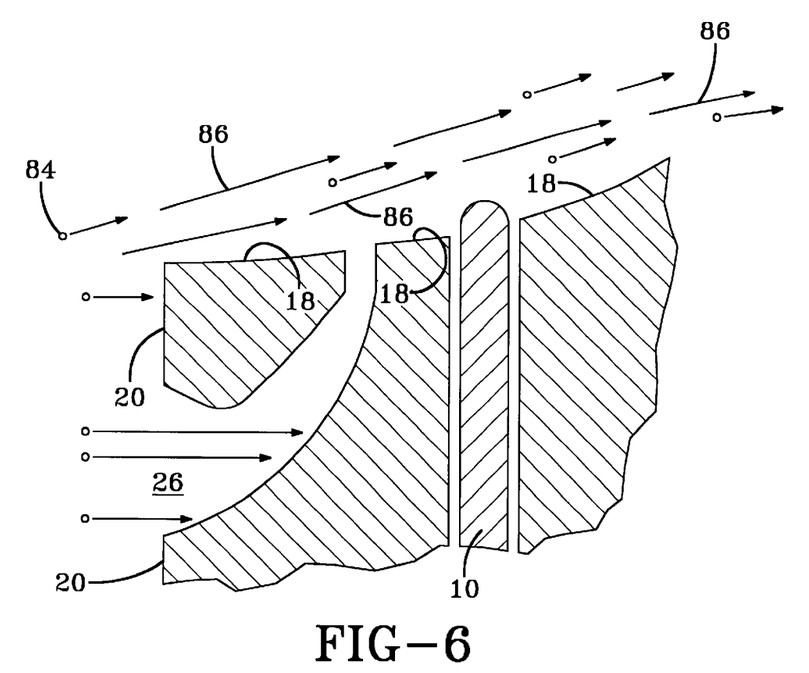
FIG. 6 is a schematic view of the area shown in FIG. 5, depicting the flow direction of twenty micron diameter water droplets.

FIG. 6 provides a schematic depiction of the flow direction of water droplets typically found in clouds capable of forming "normal" (or non-SLD) icing. As indicated above, normal icing typically occurs when an aircraft flies through a population of supercooled water droplets having a mean diameter of about twenty microns. In FIG. 6, such water droplets are represented by the reference numeral 84, and their flow path indicated by the arrows 86. As is seen in FIG. 6, and as described above, twenty micron diameter water droplets generally follow the flow direction of the air in which they are entrained. Because of the relatively small mass (and momentum) of the droplets 84, they are unable to penetrate through the separation bubbles 82 formed as a result of the vortices. Because the droplets follow the flow path of the air, and the flow path actually travels over and above the surface of the sensing element 10, the droplets do not tend to strike the surface of the element 10. While water droplets do in fact strike the leading edge surface 20 of the housing, and form ice on the leading edge surface, in the most preferred embodiment of the invention, heaters adjacent to the leading edge surface 20 melt the ice and prevent significant accretion of ice on the housing 12. Even if some of the twenty micron droplets strike the element 10 and form ice on the element, not enough of them strike and freeze on the element per unit time to give an indication of SLD icing.

Figure 7:
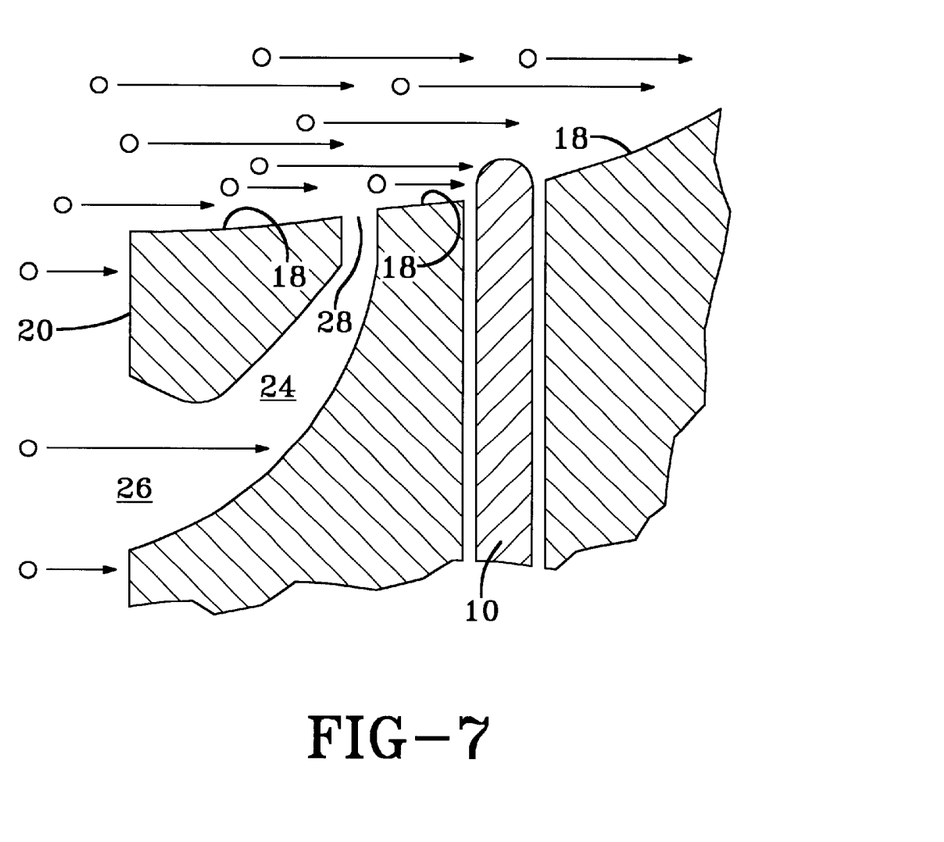
FIG. 7 is a schematic view of the area shown in FIG. 5, depicting the flow direction of fifty micron water droplets.

In contrast to the flow direction of twenty micron diameter droplets as shown in FIG. 6, FIG. 7 shows the flow direction of fifty micron diameter droplets. These SLD icing droplets have sufficient mass and momentum such that they are able to pass through the separation bubbles that form along the tip surface 18 of the housing. Because their flow direction is, to a large extent, unaffected by the vortices adjacent to the tip surface 18, the water droplets travel generally parallel to the tip surface and strike the sensing element 10, forming ice on the element 10.

In the preferred embodiment of the invention, the sensing element (reference numeral 10 in FIGS. 1 and 3; reference numerals 51 and 72 in FIG. 4) is of the vibrating element type, such that when ice forms on the element surface, its natural frequency is changed due to mass loading. Preferably, and with reference to FIGS. 1 and 3, the sensing element 10 vibrates in the direction of its longitudinal axis 34. The vibrating frequency of the element 10 is continually sensed by its associated electronics (depicted as reference numeral 41 in FIG. 2), and variations in the sensing frequency are indicative of the formation of ice on the element 10. Magnetostrictive sensing elements that operate on the aforementioned principles are available from BFGoodrich Aircraft Sensors Division in Burnsville, Minn., U.S.A.; Model No. 0871HL1.

In order to continuously obtain data from the sensing element 10 concerning the formation of ice on the element, the detector preferably includes a heater and associated controller circuitry for melting ice that forms on the sensing element 10. To accommodate any liquid water that results when ice on the sensing element melts, the housing includes one or more drain holes in fluid communication with the channel within which the element resides.

FIGS. 5, 6 and 7 show the effects that boundary layer conditions along the tip surface 18 of the housing 12 have on the flow direction of air and any entrained water droplets in the air. Droplets in the fifty micron diameter range have sufficient momentum to flow through the separation bubbles and strike the sensing element 10, while particles having a diameter less than fifty micron generally do not strike the sensing element 10.

The frequency monitoring circuitry of the sensor 10 may be adjusted to establish a threshold level above which SLD conditions will be presumed not to be present; below such threshold level, SLD conditions will be presumed to exist. The threshold level can be established taking into account the rate at which the frequency changes, as well as simply monitoring the amount of frequency change. The rate of frequency change can also be used to indicate droplet size, when compared with the output from a conventional ice detector. The threshold level and ice accumulation rate are determined from calibrations of the detector in an icing wind tunnel.

Those with ordinary skill in the art will recognize that the aerospace industry has not fully documented the precise size of water droplets that cause SLD icing. While it is generally accepted and understood that droplets having diameters greater than or equal to about fifty microns cause SLD icing when in the supercooled state, subsequent research may show that droplets having other diameters (perhaps less than fifty microns) are also the cause of SLD icing. Accordingly, while the description herein focuses on fifty microns as the threshold diameter for causing SLD icing, it should be recognized that the invention is not limited to a fifty micron diameter threshold. As indicated above, in a preferred embodiment of the invention, the ice sensing element is of the vibrating element type, which allows the user to establish threshold levels as appropriate to safely provide an indication of SLD conditions without the need to absolutely determine a droplet diameter that causes SLD icing.

The same sort of frequency sensing detection element 10 as is used in the detectors of FIGS. 1, 2 and 3 may also be used in the combination sensor shown in FIG. 4.

The rails 30 as shown in FIG. 1, and the rails 70 as shown in FIG. 4, play a particular role in the desirable performance of the inventive ice detector. The height of the rails and the relative position of the sensing element with respect to the rails both have an effect on water droplets traveling along a flow path that may not necessarily be perpendicular to the leading edge of the housing. For example, under certain flight conditions, such as high angles of attack, the droplets may strike the housing at an oblique angle. In order to prevent typical cloud size water droplets from striking the sensing element and causing an inaccurate indication of SLD icing, the rails extend above the tip surface an amount sufficient to shield or shadow the sensing element and, in conjunction with the vortices and separation bubbles that form adjacent to the sensing element, to prevent such small droplets from striking the sensing element.

When operated in an environment containing a varied population of water droplet diameters, the ice detector of the present invention is capable of providing a signal indicating whether conditions are present for forming SLD icing or whether normal cloud icing will result. If SLD icing conditions are present, the environment will contain water droplets having a variety of diameters, some of which will be in the range of fifty microns and larger and others will be smaller, in the range of about twenty microns. In such an environment, and using an SLD detector such as is shown in FIG. 4, those droplets with sufficient momentum to be undisturbed by the boundary layer (i.e., the fifty micron particles) will contact the sensor 51 in the manner as described above. Those same droplets will also strike the sensor 72. Droplets having a diameter smaller than about fifty microns will be disturbed by the boundary layer and will only strike the sensor 72 for the reasons described above. In this setting, the electronics associated with the detector 50 generates a signal indicating SLD icing conditions, i.e., ice formation on both sensors 51 and 72. However, if the detector is in conditions where the water droplets are less than fifty microns in diameter, i.e., too small to cause SLD icing, ice will form only on the second sensor 72. These small droplets will not strike the sensor 51 because of the boundary layer effects as described above. In this instance, the electronics will only provide a signal indicating ice formation on sensor 72, indicating "normal" icing conditions.

The ability of the sensor of the present invention to detect when it is in SLD icing conditions, but also to discriminate between SLD icing conditions and non-SLD icing conditions provides the aerospace industry with a key technology for improving the safety of flight in icing conditions.

Although this invention has been shown and described with respect to a preferred embodiment thereof, it will be understood by those skilled in the art that various changes in form and detail thereof may be made without departing from the spirit and scope of the claimed invention.

What is claimed is:

1. An ice detector for use in an environment containing supercooled water droplets having a flow direction, and for distinguishing between the presence of a first population of water droplets indicative of a first icing condition and a second population of water droplets indicative of a second icing condition different from the first condition, comprising:

(a) a sensor for providing a signal indicating the formation of ice thereon, and (b) a housing for supporting the sensor and including means for modifying the flow direction of water droplets flowing past the housing such that the first population of droplets are more likely to strike and form ice on the sensor and the second population of droplets are less likely to strike and form ice on the sensor.

2. The ice detector of claim 1, wherein said means for modifying the flow direction includes means for deflecting the second droplets such that they are not likely to strike and form ice on the sensor, and the first droplets are not so deflected and are likely to strike and form ice on the sensor.

3. The ice detector of claim 1, whereas said means for modifying the flow direction includes means for modifying a boundary layer of air adjacent to the sensor.

4. The ice detector of claim 1, wherein said housing extends in a downstream direction from a leading edge to a trailing edge, and the sensor is located between said leading and trailing edges, and wherein said means for modifying the flow direction is located downstream of said leading edge and upstream of said sensor.

5. The ice detector of claim 4, wherein said means for modifying the flow direction includes a fluid passageway extending in the housing, the passageway having an inlet end and an outlet end, and wherein said outlet end is located downstream of the leading edge and upstream of said sensor.

6. The ice detector of claim 5, wherein said inlet end in located along said housing leading edge, and wherein said inlet end and outlet end each define a cross sectional area, and said inlet end cross sectional area is greater than said outlet end cross sectional area.

7. The ice detector of claim 1, wherein said housing extends from a leading edge to a trailing edge, and includes a tip surface through which the sensor extends, and wherein said means for modifying the flow direction includes a pair of spaced apart rails that extend above the tip surface and said sensor is located between said rails.

8. The ice detector of claim 7, wherein said sensor has a top surface, and the rails extend above the sensor top surface.

9. The ice detector of claim 8, wherein said housing tip surface inclines upwardly from said leading edge to said trailing edge.

10. The ice detector of claim 7, wherein said housing further includes a cap extending between said rails from said leading edge to said trailing edge.

11. The ice detector of claim 10, wherein the housing includes a plurality of fluid passageways that extend in said cap in an area above the sensor.

12. The ice detector of claim 1, further including means for removing ice from said housing leading edge.

13. The ice detector of claim 1, further including a heater adjacent the leading edge.

14. The ice detector of claim 1, wherein said sensor is a magnetostrictive sensor.

15. An ice detector for use in an environment containing supercooled water droplets having a flow direction, and for distinguishing between the presence of a first population of droplets indicative of a first icing condition and a second population of droplets indicative of a second icing condition different from the first condition comprising:

(a) a sensor for providing a signal indicative of the formation of ice thereon, and (b) a housing for supporting the sensor, wherein said housing extends from a leading edge to a trailing edge and has a tip surface, and the sensor is located between said edges and extends through the tip surface, and wherein a fluid passageway extends in the housing and has an inlet end defining an inlet cross sectional area in the housing leading edge and an outlet end defining an outlet cross sectional area in the housing tip surface, and the outlet end is located downstream of the leading edge and upstream of said sensor, wherein said inlet cross sectional area is greater than said outlet cross sectional area, and said housing further includes a pair of spaced apart rails that extend above the tip surface a distance greater than the distance the sensor extends above the tip surface, and said sensor is located between said rails.

16. The ice detector of claim 15, further including a heater for raising the temperature of said housing leading edge above freezing.

17. The ice detector of claim 16, wherein said heater is adjacent to said housing leading edge.

18. The ice detector of claim 17, wherein said housing tip surface inclines upwardly from said leading edge to said trailing edge.

19. The ice detector of claim 18, wherein said housing further includes a cap extending between said rails from said leading edge to said trailing edge.

20. An ice detector comprising a sensor and a housing supporting said sensor, wherein said housing includes a base, a tip having a tip surface, and a leading edge and trailing edge each extending from the base to the tip, wherein said sensor extends through the tip surface between the leading and trailing edges, and said housing includes a fluid passageway extending from an inlet end in the leading edge to an outlet end in the tip surface, and wherein the passageway outlet end is downstream of the leading edge and upstream of the sensor, and the housing further includes a pair of spaced apart rails extending above the tip surface and above the sensor, and the sensor and outlet end are between the rails.

21. The detector of claim 20, wherein the rails extend above the tip surface a distance greater than the distance the sensor extends above said surface.

22. The detector of claim 21, wherein the tip surface inclines upwardly from the leading edge to the trailing edge.

23. The ice detector of claim 22, further including a heater adjacent the leading edge.

24. The ice detector of claim 23, further comprising a second sensor adjacent the trailing edge of the housing, the second sensor extending above the tip surface and above the rails.

25. The ice detector of claim 23, further including a heater for removing ice from the sensor.

26. The ice detector of claim 24, further including a heater for removing ice from both of said sensors.

27. An ice detector comprising a first and second sensor and a housing for supporting each of said sensors, wherein said housing includes a base, a tip having a tip surface, a leading edge and trailing edge extending from the base to the tip, wherein said first sensor is upstream of said second sensor and each of said sensors extend above the tip surface, and said housing includes a fluid passageway extending from an inlet end in the leading edge to an outlet end in the tip surface, and wherein the passageway outlet end is downstream of the leading edge and upstream of said sensors, and the housing further includes a pair of spaced apart rails extending above the surface of the tip such that the first sensor and outlet end are between the rails and the second sensor is downstream of the rails, and wherein the rails extend above the first sensor, and the second sensor extends above the rails, and wherein the ice detector further comprises a first heater for removing ice from the first sensor, a second heater for removing ice from the second sensor, and a third heater for removing ice from the housing leading edge.

* * * * *